United States Patent
Lewis et al.

(10) Patent No.: US 11,086,658 B2
(45) Date of Patent: Aug. 10, 2021

(54) SYSTEM PERFORMANCE ENHANCEMENT WITH SMI ON MULTI-CORE SYSTEMS

(71) Applicant: Insyde Software Corp., Taipei (TW)

(72) Inventors: Timothy Andrew Lewis, El Dorado Hills, CA (US); Kevin Dale Davis, Beaverton, OR (US)

(73) Assignee: Insyde Software Corp., Taipei (TW)

( * ) Notice: Subject to any disclaimer, the term of this patent is extended or adjusted under 35 U.S.C. 154(b) by 0 days.

(21) Appl. No.: 14/549,272

(22) Filed: Nov. 20, 2014

(65) Prior Publication Data

US 2015/0143089 A1 May 21, 2015

Related U.S. Application Data

(60) Provisional application No. 61/906,607, filed on Nov. 20, 2013.

(51) Int. Cl.
*G06F 9/48* (2006.01)

(52) U.S. Cl.
CPC .................. *G06F 9/4812* (2013.01)

(58) Field of Classification Search
CPC ...... G06F 13/24; G06F 9/4812; G06F 9/4405; G06F 2212/62; G06F 21/74; G06F 11/0772; G06F 21/572; H04L 2209/127
See application file for complete search history.

(56) References Cited

U.S. PATENT DOCUMENTS

| | | | | |
|---|---|---|---|---|
| 5,287,523 A * | 2/1994 | Allison | | G06F 13/24 710/50 |
| 5,710,931 A * | 1/1998 | Nakamura | | G06F 1/3203 713/323 |
| 6,571,206 B1 * | 5/2003 | Casano | | G06F 9/45537 703/25 |
| 7,797,473 B2 * | 9/2010 | Rangarajan | | G06F 13/24 710/260 |
| 8,151,027 B2 * | 4/2012 | Zimmer | | G06F 9/4812 710/261 |
| 2002/0083252 A1 * | 6/2002 | Armstrong | | G06F 9/3851 710/260 |

(Continued)

OTHER PUBLICATIONS

Delgado, B., & Karavanic, K. L. (2013). Performance implications of system management mode doi:http://dx.doi.org/10.1109/IISWC.2013.6704682.*
Azab, A. M., Ning, P., & Zhang, X. (2011). SICE: A hardware-level strongly isolated computing environment for x86 multi-core platforms doi:http://dx.doi.org/10.1145/2046707.2046752.*
Shang, M. (2014). A new hardware isolation architecture. Applied Mechanics and Materials, 530-531,631-6. doi:http://dx.doi.org/10.4028/www.scientific.net/AMM.530-531.631.*

(Continued)

*Primary Examiner* — William B Partridge
(74) *Attorney, Agent, or Firm* — McCarter & English, LLP; John S. Curran (57) ABSTRACT

Mechanisms for providing enhanced system performance and reliability on multi-core computing devices are discussed. Embodiments use modified hardware and/or software so that when a System Management Interrupt (SMI #) is generated, only a single targeted CPU core enters System Management Mode (SMM) in response to the SMI while the remaining CPU cores continue operating in normal mode. Further, a multi-threaded SMM environment and mutual exclusion objects (mutexes) may allow guarding of key hardware resources and software data structures to enable individual CPU cores among the remaining CPU cores to subsequently also enter SMM in response to a different SMI while the originally selected CPU core is still in SMM.

16 Claims, 7 Drawing Sheets

(56) References Cited

U.S. PATENT DOCUMENTS

| | | | | |
|---|---|---|---|---|
| 2004/0031034 A1* | 2/2004 | Lewis | ................... | G06F 9/4812 |
| | | | | 718/102 |
| 2005/0086547 A1* | 4/2005 | Kobayashi | ............ | G06F 9/4401 |
| | | | | 713/310 |
| 2005/0114578 A1* | 5/2005 | Lewis | ................... | G06F 21/577 |
| | | | | 710/260 |
| 2007/0239917 A1* | 10/2007 | Orita | ........................ | G06F 13/24 |
| | | | | 710/268 |
| 2010/0262743 A1* | 10/2010 | Zimmer | ................ | G06F 9/4812 |
| | | | | 710/267 |

OTHER PUBLICATIONS

Hewlett-Packard Corporation et al., Advanced Configuration and Power Interface Specification. Revision 5.0. 958 pages. Dec. 6, 2011.

Intel, Intel® 64 and IA-32 Architectures Software Developer's Manual. Combined vols. 1, 2A, 2B, 2C, 3A, 3B, 3C. 544 pages, Jun. 2014.

Unified EFI, Inc., vol. 1: Platform Initialization Specification. Pre-EFI Initialization Core Interface, Version 1.2 Errata C. 238 pages, Oct. 27, 2011.

Unified EFI, Inc., vol. 4: Platform Initialization Specification. System Management Mode Core Interface. Version 1.3. 292 pages. Mar. 29, 2013.

\* cited by examiner

SYSTEM PERFORMANCE ENHANCEMENT WITH SMI ON MULTI-CORE SYSTEMS

RELATED APPLICATION

This application is related to, and claims the benefit of, U.S. Provisional Patent Application No. 61/906,607, entitled "System Performance Enhancement with SMI on Multi-Core Systems", filed Nov. 20, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash ROM (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

A computing device may contain one or more elements known as Central Processing Units (CPUs). Each CPU may have more than one core. These CPUs and CPU cores may have a normal operating mode and a second operating mode called System Management Mode (SMM). When the CPU/CPU core is in normal operating mode it can access all elements of the computer except certain memory regions exclusively dedicated to SMM. In contrast, when the CPU/CPU core is operating in SMM it is able to access all elements of the computing device including the memory locations allocated for SMM. One of the services provided by the firmware after the loading of the operating system may be the handling of System Management Interrupts (SMI) events in SMM after the SMI detection has caused the CPU/CPU core to transition to SMM. The exact SMI events causing a transition to SMM differ somewhat among system designs but the result of the detection of the SMI event is that execution in main memory is immediately suspended and execution begins at a specific location in SMM protected memory, such as System Management RAM (SMRAM). Once the CPU/CPU core is in SMM, protected firmware code may be executed by the CPU/CPU core in response to the detected SMI. For example, SMM may be used to manage system safety functions such as fan control or shutdown in response to high CPU temperature readings, system events like memory or chipset errors, security functions and other functions requiring an isolated processor environment inaccessible to application or general purpose software.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. UEFI specifications tell the desired result but deliberately do not specify the internal tactic of implementation. The UEFI firmware specification replaces earlier operating system (OS)/firmware interfaces previously used by the industry and commonly known as legacy BIOS (Basic Input Output System). When implemented in a computing device, the machine codes for UEFI firmware and all permanent data used by the firmware reside in ROM.

BRIEF SUMMARY

Embodiments of the present invention provide enhanced system performance and reliability in multi-core computing devices. More particularly, embodiments of the present invention may use modified hardware and/or software so that when a System Management Interrupt (SMI #) is generated, only a single targeted CPU core enters System Management Mode (SMM) in response to the SMI while the remaining CPU cores continue operating in normal mode. The single CPU core may be selected based on the type of SMI or may be tasked with handling all SMIs. Further, a multi-threaded SMM environment and mutual exclusion objects (mutexes) may allow guarding of key hardware resources and software data structures to enable individual CPU cores among the remaining CPU cores to subsequently also enter SMM in response to a different SMI while the originally selected CPU core is still in SMM.

In one embodiment, a computing device-implemented method for handling SMIs in a multi-core computing device having multiple CPU cores includes the step of detecting an SMI that is initiated by software or a signal or message external to the CPU cores. The SMI is detected while the CPU cores are executing in a normal operating mode and the computing device is under control of an operating system. The method also transitions, in response to the SMI detection, only a single core from among the multiple CPU cores to SMM while a remaining group of CPU cores from the multiple CPU cores remains in the normal operating mode. The method additionally handles the SMI with the single core that is in SMM and returns the single core to normal operating mode following the handling.

In one aspect, the method also detects a second SMI, while the remaining group of CPU cores are executing in a normal operating mode and the single core is operating in SMM. The second SMI is initiated by software or a signal or message external to the plurality of CPU cores. The method also transitions, in response to the detection of the second SMI, only a second core from among the remaining group of CPU cores to SMM while the single core is still in SMM. The other cores in the remaining group of CPU cores remain in normal operating mode. The method handles the second SMI with the second core that has transitioned to SMM and returns the second core to normal operating mode following the handling.

In another embodiment, a computing device includes multiple CPU cores operable in a normal operating mode and operable in SMM. The computing device also includes a non-volatile memory holding firmware. The firmware includes an SMI handler. Additionally, the computing device includes a volatile memory holding the operating system. In response to detection of an SMI that is initiated by software or a signal or message external to the CPU cores while the multiple CPU cores are executing in the normal operating mode and the computing device is under control of the operating system, only a single core from among the multiple CPU cores is transitioned to SMM. A remaining group of CPU cores from the multiple CPU cores remain in the normal operating mode. The SMI handler handles the SMI with the single core transitioned to SMM and the single core is returned to normal operating mode following the handling of the SMI.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Embodiments of the present invention improve system performance and reliability in a multi-core computing device by requiring only a single CPU core from a multi-core system to transition into SMM in response to a detected external SMI event. Rather than all cores entering SMM at their respective next instruction boundary in response to the SMI event, only a single core enters SMM to handle the detected SMI. This allows the other cores to continue to process application tasks in a normal operating mode. By enabling the other cores to continue normal operation, the multi-core system of the present invention achieves higher application performance and greater reliability (since there is lower overall latency). Additionally, in one embodiment, SMI sources can be directed to specific CPU cores having specific resources such as encryption. In another embodiment, one CPU core can be dedicated to SMI-related tasks resulting in a high predictability for the response times of other cores. Embodiments also provide a multi-threaded SMM environment for SMI handling that accommodates simultaneous handling of different SMI events by different CPU cores.

Figure 1:
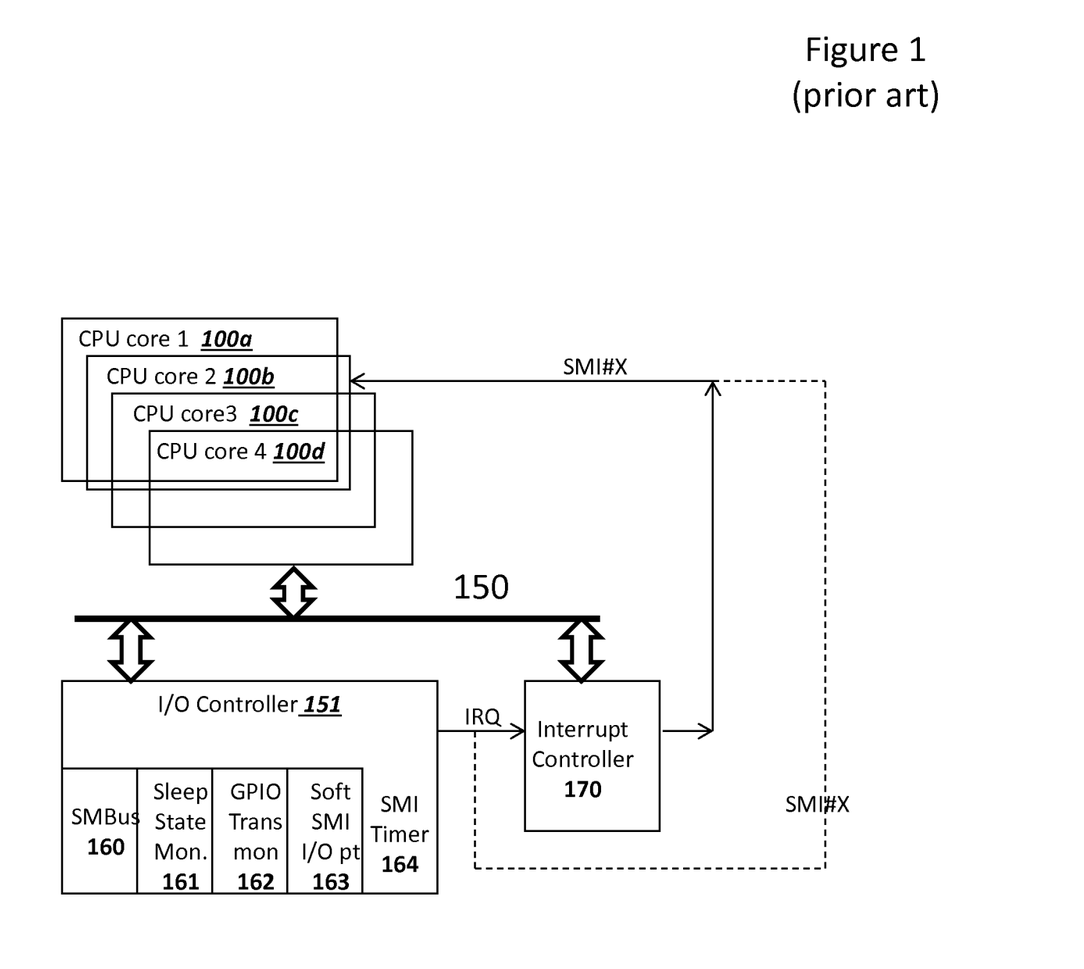
FIG. 1 (prior art) depicts a high level diagram of a conventional chipset.

FIG. 1 (prior art) depicts a high level diagram of a conventional chipset, the core silicon components that make up a typical computer system. Among other elements, the diagram depicts CPU cores and I/O controllers. It should be understood that the diagram is not complete since real computer systems would also have memory controllers, and various other peripheral components that have been omitted here for ease of illustration. Likewise, the diagram is not meant to be exhaustive, since computer systems may break up these functions in a somewhat different manner. Each of the CPU cores 100a, 100b, 100c and 110d represents a physical CPU core or logical thread within a CPU core which can respond separately to an SMI. Each of these cores is connected by a signaling mechanism to an interrupt controller 170 (such as an Advanced Programmable Interrupt Controller (APIC)), which typically resides in the I/O controller 151 (for ease of explanation the interrupt controller and I/O controller have been depicted separately). The signaling mechanism may be as simple as an SMI # signal or it may be a message carried across some form of processor bus such as I/O Bus 150 or using message signaled interrupts (MSI) on the PCI bus. The I/O APIC is common on Intel™ architecture platforms and represents a device which can route external interrupts as well as generate interrupts under the control of software. The I/O APIC can direct individual interrupts to particular CPU cores and is discussed further below. In CPU cores which support multiple logical CPU threads (sometimes referred to as hyper-threading), either a single thread may enter SMM independently or all threads may enter and exit together.

Some chipsets may not use the I/O APIC for generating all SMIs. The other depicted devices (SMBus 160, Sleep State Monitor 161, GPIO Transition Monitor 162, Software SMI I/O Port 163 and SMI Timer 164) represent logical components that can generate interrupts, including SMIs. These components are able to detect a specific condition, such as a GPIO transitioning from high to low, a timer expiring or an I/O or memory address access. Upon detection, these components generate an interrupt. Some devices can only generate specific types of interrupts, such as a normal interrupt, a non-maskable interrupt (NMI) or an SMI. Conventionally, x86 systems have used broadcast SMIs for nearly all SMI sources which cause all of the cores in a system to initially transition into SMM in response to a detected SMI.

Figure 2:
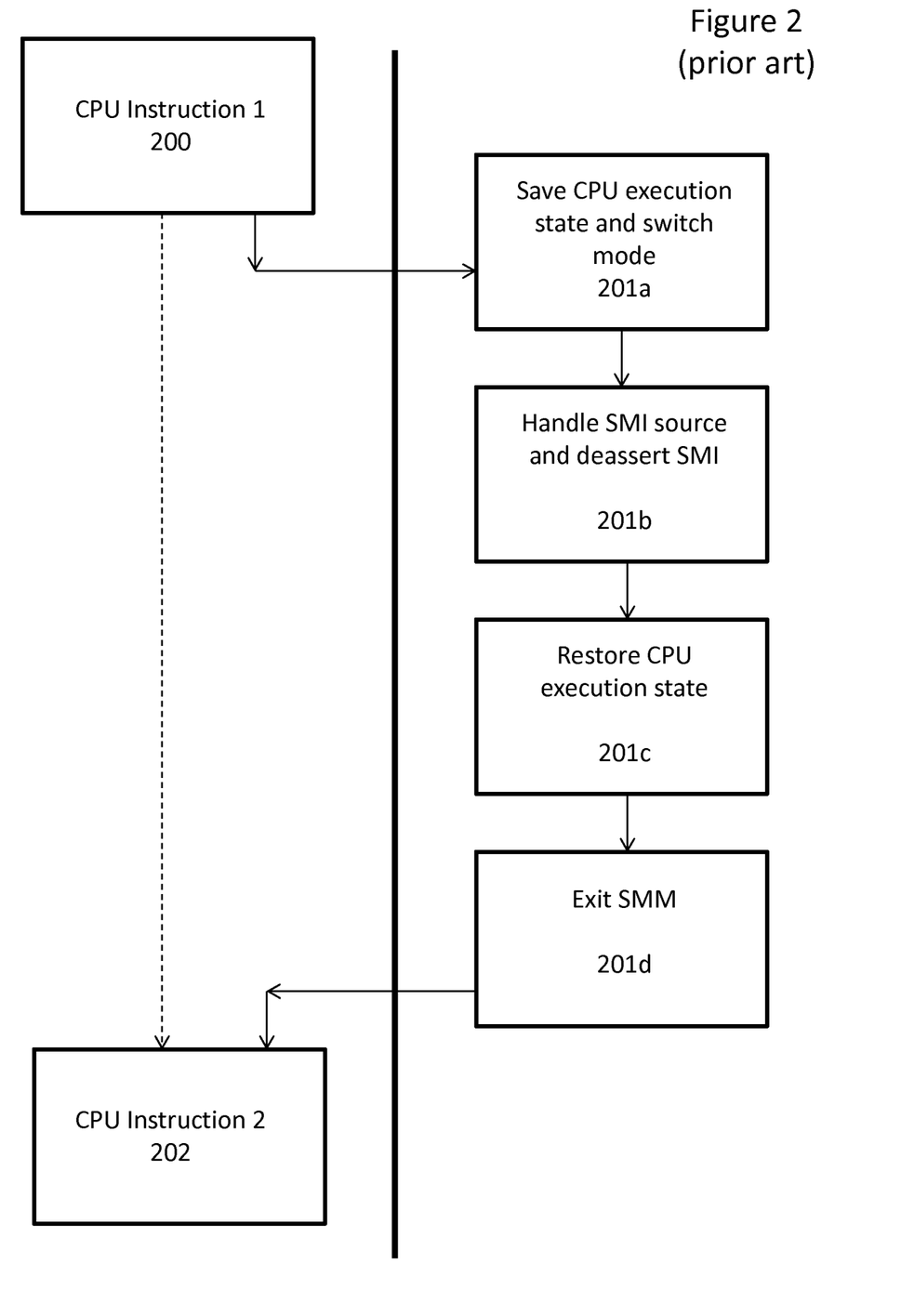
FIG. 2 (prior art) depicts a conventional sequence of steps for handling an SMI in SMM.

FIG. 2 depicts a conventional sequence of steps for handling an SMI event in SMM. The SMI is the highest priority interrupt on most x86 CPUs. CPUs detect interrupts, including SMIs, after completing the execution of the current instruction (step 200). When this happens for an SMI, instead of continuing to the next instruction (step 202), the CPU/CPU core transitions into SMM. Once in SMM, enough of the current CPU execution state is saved in order to be able to resume execution after processing the SMI. This execution state may include CPU registers, CPU mode information, the instruction and stack pointers, etc. The execution state information is saved in a pre-defined memory location (the SMM State Area). In some CPUs, the operating mode of the CPU upon entry to SMM may not match the desired operating mode for code running in SMM and is switched (step 201a). For example, in many Intel CPUs, the execution mode upon entry to SMM is "big real" mode but the desired CPU mode for SMM code is usually either 32-bit or 64-bit protected mode, since this matches the mode used in UEFI firmware. The method of switching modes is well-known and involves manipulation of specific CPU registers to enable. Then the CPU core begins execution at a pre-defined address, usually in a reserved block of system memory known as SMRAM. The interrupt handler (or SMI handler) is provided by the firmware and is responsible for handling the interrupt condition such that the SMI interrupt is de-asserted (step 201b). Subsequently, after the code to handle the interrupt has been executed, the interrupt handler restores the previously saved CPU execution state from the SMM Save State Area (step 201c), the CPU is returned to a normal operating mode, and SMM is exited (step 201d). In x86 CPUs, the exit is performed using the RSM (resume) instruction. Execution is then resumed by the CPU at the next instruction after the instruction boundary at which the SMI was originally detected (step 202).

As mentioned above, in x86 systems today, almost all SMI sources broadcast the SMI to all CPU cores. That is, the SMI is delivered nearly simultaneously to all CPU cores. Each of those CPU cores will enter into SMM at slightly different times, depending on when each core reaches an instruction boundary. Current SMM entry code waits for all active CPU cores to enter SMM and then releases/selects exactly one CPU core to handle the SMI. All others cores are initially held waiting until after the selection at which point they are released from waiting so that they can exit SMM. This process is inefficient as it requires all CPU/cores to initially enter SMM which interrupts their normal processing of instructions under control of the operating system. This existing practice does however have some benefits in that there is no requirement for arbitration between CPU cores for hardware resources. For example, since only one CPU core is tasked with responding to the SMI, only one CPU core is reading and resetting the SMI-related hardware registers. As a result, there is no need to add a mutex (a mutual exclusion object—program object preventing simultaneous access), to a hardware resource. As another example, since all CPU cores are in SMM, the SMI-handling CPU can manipulate hardware resources to which "normal mode" software (such as OS drivers) assumes that they have complete and exclusive access. For example, sending a command to the embedded controller using the same command port as the OS PS/2 keyboard driver, or manipulating the real-time clock wake up configuration using the same I/O ports as the OS clock driver.

Figure 3:
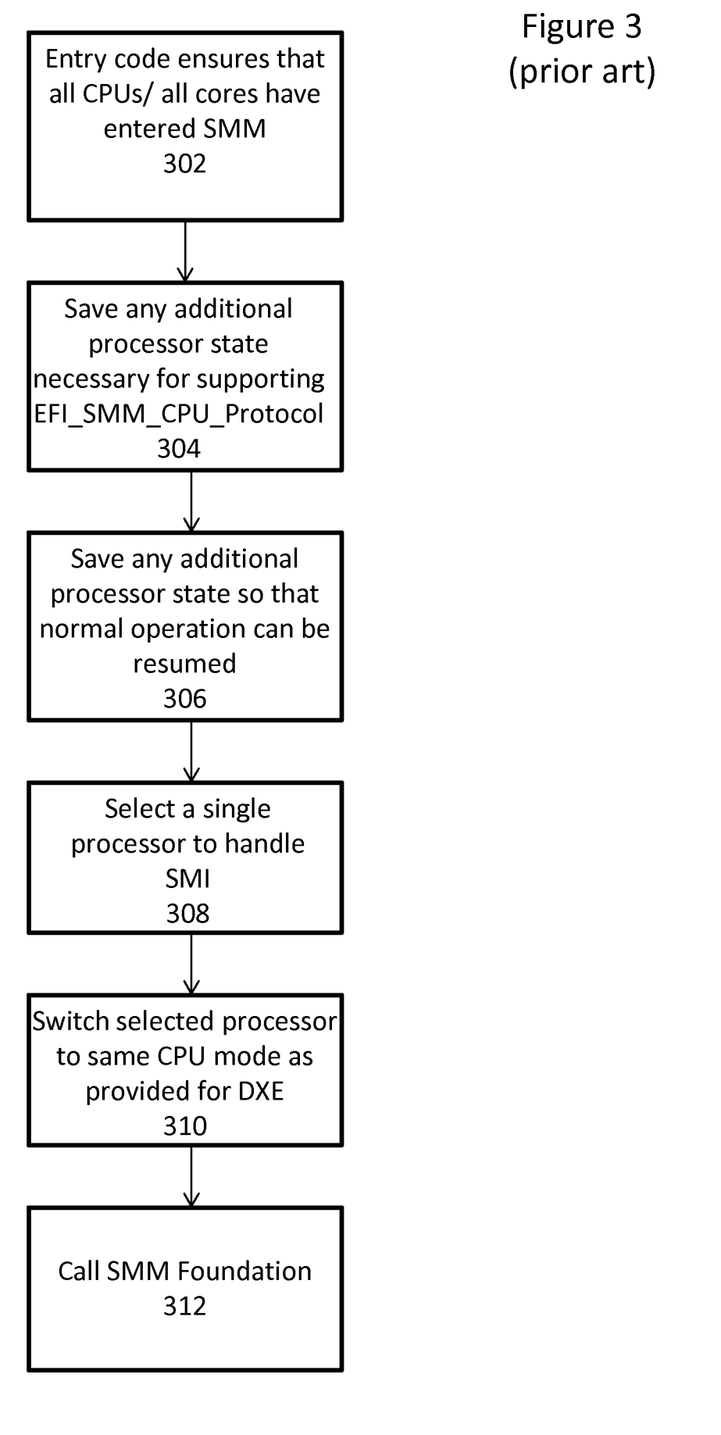
FIG. 3 (prior art) depicts a conventional sequence for performing SMM entry.

This conventional process by which SMM is initially entered by all the CPU cores is discussed in more detail in FIG. 3 which depicts a conventional sequence for performing SMM entry. These steps are also described in Volume 4, section 1.5 of the *Platform Initialization Specification*, Revision 1.21, www.uefi.org. The sequence begins following the detection of an SMI event with SMM firmware entry code ensuring that all CPUs/CPU cores have entered into SMM (step 302). Typically, as each CPU core enters SMM, the code increments a counter. When that counter reaches the number of CPU cores detected in the system, the first CPU core that entered is (typically) released to handle the SMI. The entry code also saves any additional processor state necessary for supporting the EFI_SMM_CPU_PROTOCOL which provides access to CPU-related information while in SMM (step 304). The entry code further saves any additional processor state so that normal operation can be resumed, including CPU mode information and CPU register contents (step 306) and selects a single processor/core to handle the detected SMI (step 308). The selected processor is also switched by the entry code to the same CPU mode as provided for DXE (Driver Execution Environment) (step 310). This happens in cases where the x86 CPU enters SMM in another operating mode such as "big real" mode and must have some registers configured for it to operate in the same protected mode configuration (32-bit or 64-bit) in which the DXE phase was previously configured to operate. Subsequently, the SMM Foundation is called so that the SMI can be handled by the selected processor/core (step 312). The non-selected CPUs/cores are held in a waiting state until the selected CPU core completes the SMI handling. Then all CPU cores execute the resume instruction(s), allowing them to exit SMM. This process by which all of the cores initially halt execution and enter SMM prior to one of the cores being selected is inefficient.

Embodiments of the present invention provide a number of changes and improvements to a conventional multi-core system's SMI handling. More particularly, embodiments of the present invention allow a particular CPU core to be targeted to handle a particular, externally occurring, SMI event through a variety of new hardware and software mechanisms. Additionally, the targeted core is the only core in the multi-core system of the present invention that enters SMM in response to the detected SMI thereby leaving the remaining CPU cores available to continue instruction processing under control of the OS. The targeted core may be a dedicated core tasked with handling all SMI events or may be selected based on the type of SMI event. Further, a multi-threaded SMM environment may be provided that enables individual CPU cores among the remaining CPU cores to enter SMM in response to a subsequently detected, different SMI while the originally selected CPU core is still in SMM.

In one embodiment of the present invention, additional hardware is used to select a single CPU core to handle a detected SMI event while leaving the remaining CPU cores in the system available for normal operation. As noted above, conventionally, x86 systems have used broadcast SMIs for SMI sources. Instead of this broadcast approach, in an embodiment of the present invention, the redirection tables of the I/O APIC are used to route the interrupts it receives to one or more local APICs on CPUs. Alternately, where a dedicated SMI # signal is used, a signal MUX maybe used to redirect the interrupt signal itself to a specific local APIC.

It should be noted that conventionally there are two exceptions to the rule that SMIs are broadcast for SMI sources rather than being directed to a specific CPU core. The first exception is through the use of an I/O APIC. As described in Volume 3, chapter 10 of the Intel™ Software Developer's Guide, the I/O APIC can direct an SMI to a specific CPU core. This method is used for setting up the address of the SMM entry point and CPU Save State Area within SMRAM. In this case, CPUs are placed in a halted state with their local APIC configured to ignore all interrupts (including SMIs). This state is called the "wait-for-SIPI" state, which refers to the special command later sent by another CPU core to remove the halted CPU core from this state. The second SMI source conventionally directed to a specific CPU core is a local CPU SMI source, where a single CPU core generates an SMI to itself, such as the on-die thermal sensor. For example, some Intel™ CPUs have on-board thermal sensors which trigger an SMI only for the specific CPU/core that is having the thermal issue. However, these SMIs can only originate from the CPU on which the thermal event occurs because it is not signaled externally using the CPU-side bus. In this second case, the CPU core only accesses its own on-chip hardware resources and so does not run into resource contention issues.

Embodiments of the present invention also allow the single CPU core selected for SMI handling to be targeted using software-based approaches. In one embodiment, updated normal mode software (software executing outside of SMM) uses I/O APICs for software-initiated SMIs instead of an I/O port. Software-generated SMIs ("soft SMIs") are typically generated using a write to an I/O port (such as 0xb2). These soft SMIs are used as a primitive form of function call, where CPU registers or memory buffer contents are loaded with parameters prior to the generation of the SMI. The SMI handler then detects the software-generated SMI and uses the parameters to perform a function and return values placed in CPU registers or a memory buffer. In current practice, this action broadcasts an SMI to all CPU cores, which is inefficient, since all CPU cores are halted to handle what is, effectively, a function call. In one embodiment, this approach can be can be replaced with an SMI generated using the I/O APIC. These I/O APIC SMIs can be directed to any CPU core, which allows that CPU to handle the soft SMI while others continue in normal mode. It should be appreciated that it is possible for an embodiment of the present invention to not include this updated normal mode software, but then some form of updated hardware should be implemented to redirect software-generated SMIs to a specific CPU core.

In one embodiment, the CPU core selected for SMI generation may further be qualified by the value written to an I/O port. Since software-generated SMIs ("soft SMIs") are often used as a form of service call to the firmware, this enhancement allows certain soft SMIs to be handled by specific CPU cores, such as those which having specific hardware capabilities like cryptography capabilities.

Figure 4:
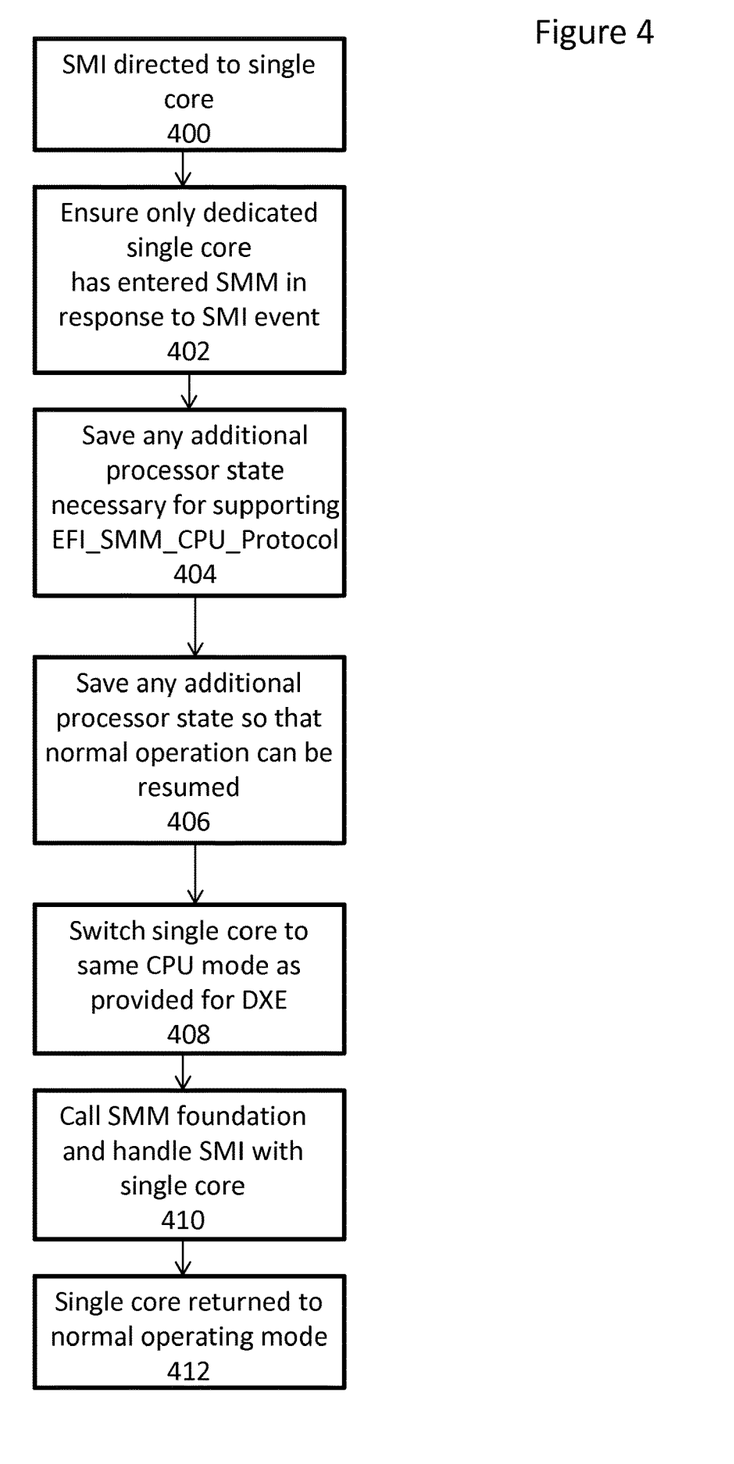
FIG. 4 depicts an exemplary SMM entry in an embodiment of the present invention where only a single CPU or core enters SMM in response to a detected SMI.

SMI handling by CPU cores operating in SMM in the embodiments of the present invention may occur in a number of different ways that each have advantages and challenges. In one embodiment a single core may be dedicated to handling all SMIs in the system while the other cores continue normal operation. For example the dedicated core may have unique resources that make its use in SMI handling desirable. This approach of using only a dedicated core to respond to SMIs that enters SMM by itself is simpler for the firmware because it requires no modification to existing SMI handling code since current practice does not provide for reentrance into SMM services or mutexes around SMM-provided resources. The SMM entry/exit firmware does need to be updated to support the dedicated core entering the SMM environment without waiting for all CPU (core)s to enter as is done conventionally. Further, the use of a dedicated core in SMI handling requires either software configuration or updated hardware to target all SMIs to the dedicated single core such as by using the techniques described above. This approach to SMM entry is depicted in FIG. 4. An SMI is directed to the dedicated core (step 400) and the firmware SMM entry code ensures that only the dedicated single core enters SMM in response to the particular detected SMI event and does not wait for other cores to enter SMM (step 402). The entry code also saves any additional processor state necessary for supporting the EFI_SMM_CPU_PROTOCOL (step 404) and saves any additional processor state so that normal operation can be resumed by the core after SMI handling (step 406). The selected processor is also switched by the entry code to the same CPU mode as provided for DXE (step 408). The SMI Foundation code is called and the SMI is then handled using the dedicated CPU core that has entered SMM by executing appropriate code for the particular SMI (step 410). In this sequence, non-targeted CPU cores (the cores not dedicated for SMI handling) do not have to enter SMM and can continue normal operation. Further, the SMM entry code does not need to perform the selection of a CPU core to handle the SMI (since only one core has entered SMM). Following SMI handling, the dedicated single core is returned to normal operating mode (step 412).

In another embodiment, any of the cores may be individually targeted using one of the hardware or software-based techniques described above to respond to particular SMIs at overlapping times. However, the targeted SMIs individually responding to different SMIs are held in the SMM entry/exit code so that only a single CPU core ever enters the SMI handling portion of SMM at any given time. For example, a multi-core safe spin-lock may be employed to prevent the other cores from entering SMM while an earlier core is finishing the SMI handling stages. The spin lock causes another CPU core attempting SMM entry (in response to another SMI) to wait in a loop (i.e. spin) until the lock has been released to avoid resource contention. The advantages of this approach are the same as for the dedicated core approach, but with the addition that less configuration is required.

In another embodiment discussed further below, a multi-threaded SMM environment allows multiple CPU cores to respond to the different SMIs, enter SMM and enter the SMI handling independently. The advantage of this approach is that it gives the highest possible performance, since all CPUs can handle SMIs as quickly as possible without being held outside of the SMM handling code. The disadvantage is that the SMI handling code must be updated to prevent simultaneous access to hardware resources, including the SMI source detection registers and other I/O.

Figure 5:
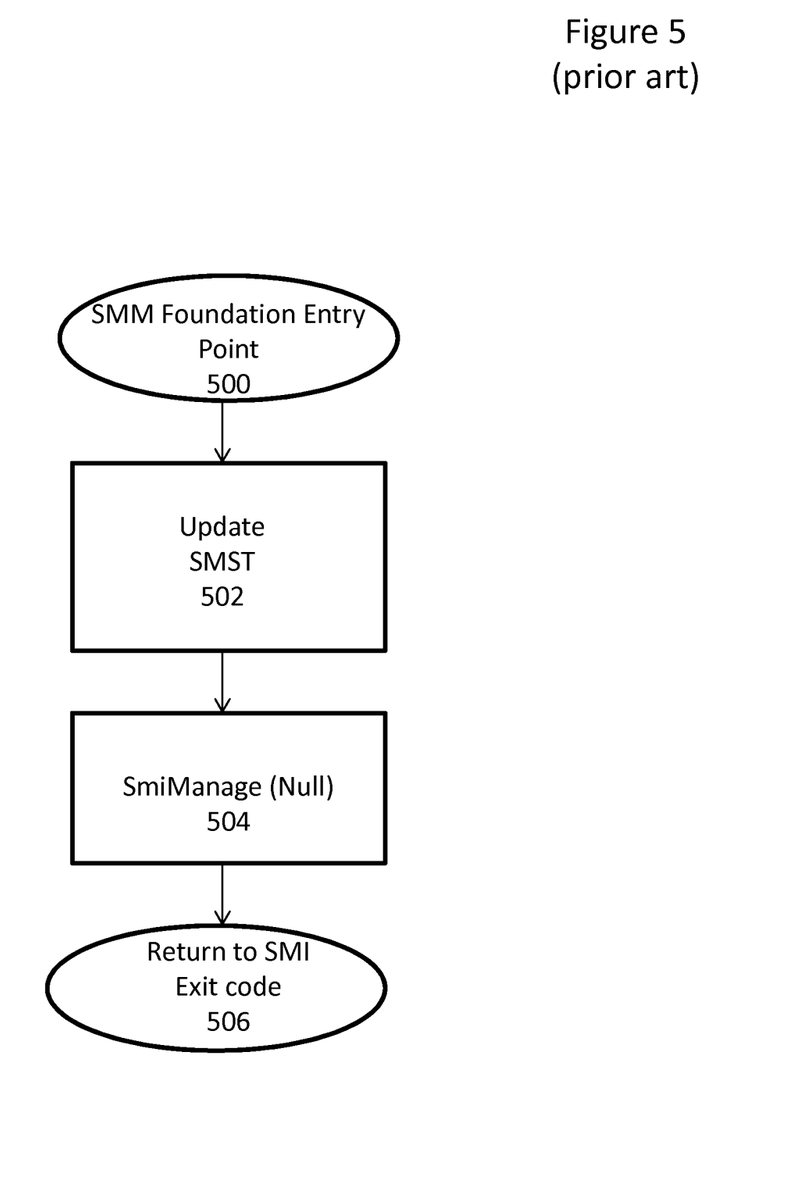
FIG. 5 (prior art) depicts a conventional sequence of steps performed following SMM entry.

Once in SMM, the CPU core executes the SMI handler code to respond to the detected SMI event. In one embodiment of the present invention, the SMI handler is updated to be multi-threaded so that each detected SMI source is handled in its own thread. This multi-threading is necessary as different cores could enter SMM at overlapping times to handle separate SMIs and resources must be properly allocated. The conventional SMI handling process that is not multi-threaded is described in section 1.5 of volume 4 of the Platform Initialization Specification and depicted in FIG. 5. The selected CPU core executes code that updates the System Management System Table (SMST) with processor information (step 502) that was passed to the SMM foundation entry point when the SMM foundation was called (step 500). The SMST provides a set of capabilities exported for use by all drivers that are loaded into SMRAM. After the SMST has been updated, all root SMI controller handles are called using SmiManage(Null) (which calls the SMI handler code which responds to the SMI). Once finished, execution is returned to the SMI exit code (step 506).

Figure 6:
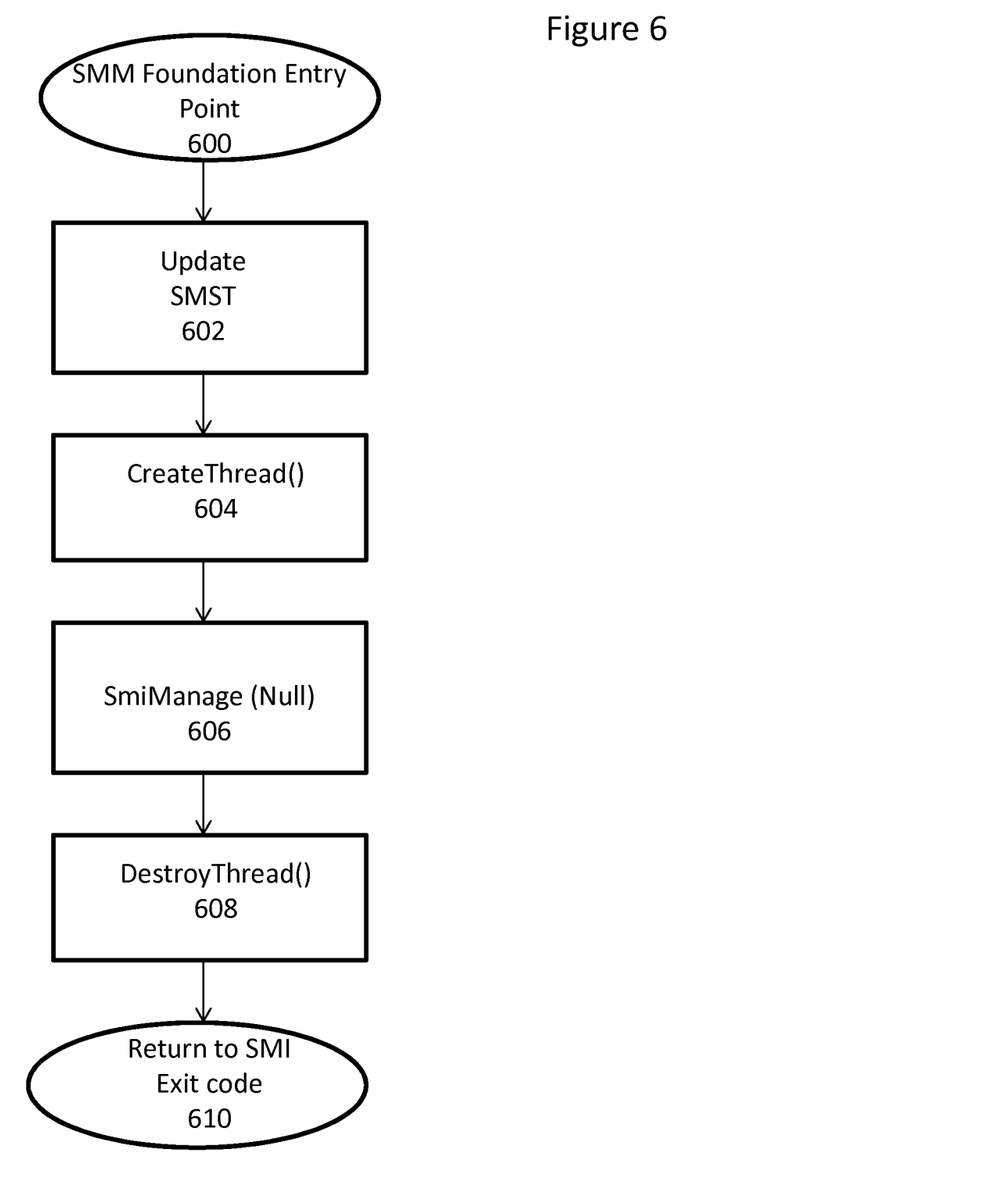
FIG. 6 depicts an exemplary sequence of steps performed by an embodiment of the present invention to create a multi-thread environment for SMI handling.

To this sequence, embodiments of the present invention introduce a multi-threaded multi-core aware environment built on top of the PI SMM infrastructure. FIG. 6 depicts an exemplary sequence of steps performed by an embodiment of the present invention to provide an updated SMI handler where each detected SMI source is handled in its own thread. A low-priority thread is created for each CPU core that enters the SMM Foundation. In one embodiment the SMM Foundation entry point is able to handle reentrancy, where its services may be called again before completion. When the SMI entry/exit code allows multiple CPU cores to enter the SMM Foundation, the key data structures must be protected by some form of mutex or similar mechanism. In an embodiment, the SMST is updated to reflect the current CPU core. Since the SMST is a global data structure, shared by all SMM drivers, the value of CurrentlyExecutingCpu would be overwritten by later CPU cores entering the SMM foundation. In order to maintain compatibility with previous PI software, the field CurrentlyExecutingCpu is always set to 0 and NumberOfCpus will actually represent the total number of CPU cores+1. The CPU Save State protocol uses 0 to refer to the current CPU, while 1+ refers to actual CPU cores. The CpuSaveState and CpuSaveStateSize are valid. The SMM Thread function GetCpu( ) may be used to identify the actual CPU core being executed on. In an embodiment, a thread is created out of the current running CPU core, at a low priority (step 604). This thread creation step is somewhat similar to the code in most RTOS implementations that creates a thread from the CPU's interrupt vector. The sequence then calls the standard SmiManage function with NULL (step 606) which indicates that the root SMI dispatchers will be called. Following the handling of the SMI, the thread is destroyed (step 608) and execution is returned to the SMI exit code (step 610).

In one embodiment, updated normal/SMM code uses new cooperation methods with the normal mode software so that SMM can share hardware resources with normal mode hardware. Embodiments may use the GlobalLock mechanism described in the Advanced Configuration and Power Interface (ACPI) specification for gaining cooperative control over resources governed by the operating system. The Global Lock (section 5.2.10.1 of the ACPI Specification) represents an optional mechanism for firmware to indicate a hardware resource should be shared between the OS and firmware. The Global Lock generates an SMI when the OS releases the Global Lock. In an embodiment, the SMI handler for this SMI source releases the threading global Global Lock mutex. Acquiring the global lock mutex causes an SCI to be generated.

In an embodiment, updated SMM services account for the fact that not all CPU cores will be in SMM simultaneously in the present invention. For example, many of the APIs described in the UEFI PI specification need to add multithreaded support to guard against reentrancy and new error codes are required to indicate a failure when a specified CPU is not in SMM. The SMM services described in the SMST must be reentrant and the SMM Status Code protocol must be reentrant. Further, the CPU Save State access protocols and the child dispatch protocols must be reentrant.

In one embodiment, in order to handle backward compatibility with existing Platform Initialization compliant SMM drivers, the SMI handlers of the present invention may be dispatched, by default, with threading disabled. Threading is re-enabled after the handler returns successfully. Threading may be enabled for an SMI handler by using the EnableSmiHandlerThreading( ) member function of the SMM Thread protocol, which registers the DispatchHandler with the SMM Thread manager. If SmiManage( ) is used to manage child dispatch handlers, then it is consulted automatically when deciding whether to execute an SMI handler as a separate thread or else as a part of the current thread (with threading disabled). If SmiManage( ) is not used to manage child dispatch handlers, then the child dispatch manager can use GetSmiHandlerThread( ) to track whether threading was enabled for a specific child dispatch handler. The utility function CallSmiHandler( ) encompasses this logic.

In an embodiment, the function SMST SmmStartupThisAp( ) creates a thread on the specified CPU, if the specified CPU is available in SMM. In another embodiment, the CPU Save State Access Protocol is updated so that if 0 is passed in as CpuIndex to ReadSaveState( ) or WriteSaveState( ), then the current CPU index from the SMM Thread protocol's GetCpu( ) function may be used. Otherwise CpuIndex of 1+ will be used.

In one embodiment, an SMM Thread protocol is produced by the SMM Foundation to provide threading services for SMM drivers. There are three basic object types: threads, events and mutexes. Threads consist of an instruction pointer, a CPU register state, a CPU core, a stack, and a priority level. They are scheduled based on readiness and priority with no pre-emption. If there is no CPU core affinity, then the thread will be scheduled on any CPU core available. For example, the SMM Thread protocol produced by the SMM foundation may include the following services:
EnableThreading( )—Global enable or disable of threading on all cores. Any executing threads will continue executing until they complete or Yield( ) or Wait( ).
CallSmiHandler( )—Based on the current setting for threading on the specified dispatch handler, either call the function or create a thread to call the function at current priority+1.
EnableSmiHandlerThreading( )—Enable or disable threading for a specified dispatch handler.
GetSmiHandlerThreading( )—Return whether a specified dispatch handler has threading enabled.
GetCpu( )—Return the current executing CPU core.
CreateThread( )—Create a thread.
DestroyThread( )—Destroy the specified thread.
SuspendThread( )—Remove specified thread from the scheduler.
ResumeThraed( )—Restore a thread to the scheduler.
CreateEvent( )—Create an event.
SignalEvent( )—Signal an event.
WaitForEvent( )—Wait for any of a group of events or mutexes to be signaled.
CheckEvent( )—Check to see if the specified event has been signaled.
SetTimer( )—Attach a timer to the specified event.
CloseEvent( )—Disable the specified event.
GetPriority( )—Get the thread priority for the specified thread.
SetPriority( )—Set the thread priority for the specified thread.
GetThreadId( )—Get the id for the current thread.
CreateMutex( )—Create a named mutex.
AcquireMutex( )—Acquire a named mutex.
ReleaseMutex( )—Release a named mutex.
TimerTick( )—Called by a registered SMI timer handler to allow timer events to be signaled.
Yield( )—Schedule for execution the highest-priority thread.

In one embodiment, in order to maintain compatibility with non-thread aware SMM drivers, the driver entry point is dispatched with threading disabled so that the driver may call SMM, DXE and UEFI services without worrying about resource and reentrancy issues. When SMM drivers register child dispatch handlers, they are, by default, also dispatched with threading disabled. The SMM_THREAD protocol may be used to enable threading for child dispatch handlers using the DispatchHandle returned from the Register( ) function of these protocols.

It should be appreciated that other embodiments are also possible within the scope of the present invention. For example, in some systems, the SMI signaling may be less granular so that groups of CPUs must enter into SMM at the same time (rather than an individual CPU). This may occur where multiple cores are packaged in the same chip and the external SMI signal is routed to all cores indiscriminately. Alternatively, access to OS resources using a SMI handler may be initiated with an SMI all-call, where all CPU cores may be signaled to enter SMM either using a broadcast IPI or some other event. This would be done when the SMI handler might need to access system-wide resources during the removal or insertion of, for example, a DRAM stick or CPU core.

Although the description contained herein has referred to a multi-core system it should be appreciated that the description is also applicable to multi-CPU systems configured with multiple single core CPUs.

Figure 7:
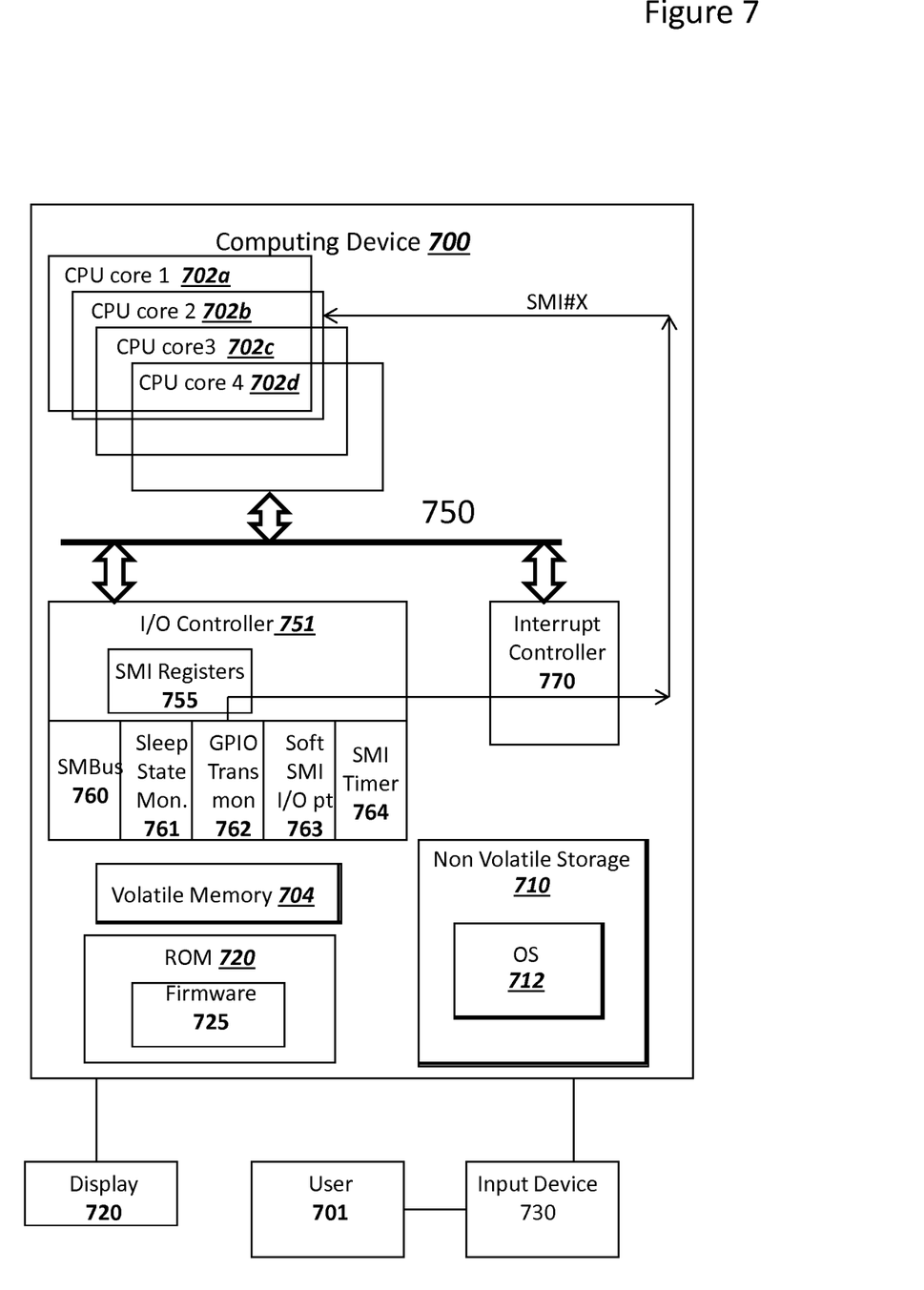
FIG. 7 depicts an exemplary environment suitable for practicing an embodiment of the present invention.

FIG. 7 depicts an exemplary environment suitable for practicing an embodiment of the present invention. A computing device 700 includes CPU cores 702a, 702b, 702c and 702d used to process instructions which can respond separately as described herein to an SMI. Each of these cores 702a, 702b, 702c and 702d is connected by a signaling mechanism to an interrupt controller 770, which typically resides in the I/O Controller 751. The signaling mechanism may be an SMI # signal or it may be a message carried across a processor bus such as I/O Bus 750. Computing device 700 may also include SMBus 760, Sleep State Monitor 761, GPIO Transition Monitor 762, Software SMI I/O Port 763 and SMI Timer 764 that can generate interrupts, including SMIs. These components are able to detect a specific SMI event and generate an SMI as described herein. For example, as depicted, a GPIO transition may cause the generation of an SMI on CPU Core 2 702b using the hardware or software based approaches described above. In an additional example, the I/O controller may include source-specific registers 755 used in routing the SMI to CPU Core 2 702b. It will be appreciated that other CPU cores instead of CPU Core 2 702b could also be configured to receive this SMI.

The computing device 700 may be a UEFI BIOS-controlled computing device. The computing device 700 may be a PC, laptop computer, tablet computing device, server, smartphone or some other type of computing device equipped with a multi-core processor. The computing device 700 may also include a volatile memory 704 such as Random Access Memory (RAM). An OS 712 that is stored on a hard drive or other non-volatile storage 710 that is in, or in a location in communication with, computing device 700 may be loaded into memory 704 as part of a boot process performed by the computing device.

The computing device 700 may also include ROM 720. In some cases the system design may incorporate multiple ROM devices. ROM 720 may include firmware 725 that is operable at different points of the computing device's operation. For example, firmware 725 may be operable when computing device 700 is executing in a normal operating mode under control of OS 712 (i.e. in a non-SMM protected mode). Firmware 725 may also be operable after computing device 700 has transitioned to SMM-protected mode and may include an SMI handler executed by a selected CPU core to respond to an SMI event. Firmware 725 may be loaded into SMRAM during a boot sequence. The computing device 700 may be in communication with a display 720 and connected to an input device 730 accessible by a user 701.

It will be appreciated that other embodiments of the present invention in addition to those specifically described herein are within the scope of the present invention. For example, instead of being a UEFI BIOS-controlled computing device, the multi-core computing system may be a non-UEFI BIOS-controlled computing device that performs equivalent actions to those described herein.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for handling System Management Interrupts (SMIs) in a multi-core computing device having a plurality of central processing unit (CPU) cores and an input/output (I/O controller), the method comprising:
    detecting a first SMI initiated by software while the plurality of CPU cores are executing in a normal operating mode and the computing device is under control of an operating system;
    transitioning, in response to the first SMI detection, only the first core from among the plurality of CPU cores to System Management Mode (SMM), a remaining group of CPU cores from the plurality of CPU cores remaining in the normal operating mode;
    handling the first SMI with the first core that is in SMM;
    detecting a second SMI initiated by software while the remaining group of CPU cores are executing in a normal operating mode and the first core is operating in SMM;
    transitioning, in response to the detection of the second SMI, only a second core from among the remaining group of CPU cores to SMM while the first core is still in SMM, a second remaining group of CPU cores from the remaining group of CPU cores remaining in the normal operating mode;
    holding the second core transitioning to SMM in a loop with SMM entry code until the first core in SMM has completed handling of the first SMI to avoid resource contention; and
    handling the second SMI with the second core that is in SMM following the completion of the handling of the first SMI with the first core;
wherein the first core is returned to normal operating mode following the handling of the first SMI and
    the second core is returned to normal operating mode following the handling of the second SMI.

2. The method of claim 1 wherein at least one of an I/O APIC redirection table or a signal MUX are used to route at least one of the first SMI to the first core and the second SMI to the second core.

3. The method of claim 1 wherein the second remaining group of CPU cores continue to process application tasks in the normal operating mode while the first SMI and second SMI are being handled by the first core and second core in SWIM.

4. The method of claim 1 wherein at least one of the first SMI or second SMI is directed to a specific one of the plurality of cores.

5. The method of claim 1 wherein an SMI handler is multi-threaded and each detected SMI source is handled in its own thread.

6. A non-transitory medium holding computer-executable instructions for handling System Management Interrupts (SMIs) in a multi-core computing device having a plurality of central processing unit (CPU) cores and an input/output (I/O controller), the instructions when executed causing the multi-core computing device to:

detect a first SMI initiated by software while the plurality of CPU cores are executing in a normal operating mode and the computing device is under control of an operating system;

transition, in response to the first SMI detection, only the first core from among the plurality of CPU cores to System Management Mode (SMM), a remaining group of CPU cores from the plurality of CPU cores remaining in the normal operating mode;

handle the first SMI with the first core that is in SMM;

detect a second SMI initiated by software while the remaining group of CPU cores are executing in a normal operating mode and the first core is operating in SMM;

transition, in response to the detection of the second SMI, only a second core from among the remaining group of CPU cores to SMM while the first core is still in SMM, a second remaining group of CPU cores from the remaining group of CPU cores remaining in the normal operating mode;

hold the second core transitioning to SMM in a loop with SMM entry code until the first core in SMM has completed handling of the first SMI to avoid resource contention; and handle the second SMI with the second core that is in SMM following the completion of the handling of the first SMI with the first core;

wherein the first core is returned to normal operating mode following the handling of the first SMI and the second core is returned to normal operating mode following the handling of the second SMI.

7. The medium of claim 6 wherein an at least one of an I/O APIC redirection table or a signal MUX are used to route at least one of the first SMI to the first core and the second SMI to the second core.

8. The medium of claim 6 wherein the second remaining group of CPU cores continue to process application tasks in the normal operating mode while the first SMI and second SMI are being handled by the first core and second core in SMM.

9. The medium of claim 6 wherein at least one of the first SMI and second SMI is directed to a specific one of the plurality of cores.

10. The method of claim 6 wherein an SMI handler is multi-threaded and each detected SMI source is handled in its own thread.

11. A computing device, comprising:
a plurality of central processing unit (CPU) cores operable in a normal operating mode and operable in a System Management Mode (SMM);
an input/output (I/O controller);
a non-volatile memory holding firmware, the firmware including a System Management Interrupt (SMI) handler; and
a volatile memory holding an operating system, wherein the computing device is configured to:
detect a first SMI initiated by software while the plurality of CPU cores are executing in the normal operating mode and the computing device is under control of the operating system, transition only a first core from among the plurality of CPU cores to SMM, a remaining group of CPU cores from the plurality of CPU cores remaining in the normal operating mode, and handle the first SMI with the first core transitioned to SMM, detect a second SMI initiated by software while the remaining group of CPU cores are executing in a normal operating mode and the first core is operating in SMM;

transition, in response to the detection of the second SMI, only a second core from among the remaining group of CPU cores to SMM while the first core is still in SMM, a second remaining group of CPU cores from the remaining group of CPU cores remaining in the normal operating mode;

hold the second core transitioning to SMM in a loop with SMM entry code until the first core in SMM has completed handling of the first SMI to avoid resource contention; and handle the second SMI with the second core transitioned to SMM following the completion of the handling of the first SMI with the first core;

wherein the first core is returned to normal operating mode following the handling of the first SMI, and the second core is returned to normal operating mode following the handling of the second SMI.

12. The computing device of claim 11, further comprising:
I/O APIC redirection tables, the I/O APIC redirection tables used to route at least one of the first SMI to the first core and the second SMI to the second core.

13. The computing device of claim 11, further comprising:
a signal mux, the signal mux used to route at least one of the first SMI to the first core and the second SMI to the second core.

14. The computing device of claim 11 wherein the second remaining group of CPU cores continue to process application tasks in normal operating mode while the first SMI is handled by the first core and the second SMI is handled by the second core in SMM.

15. The computing device of claim 11 wherein at least one of the first SMI and second SMI is directed to a specific one of the plurality of cores.

16. The computing device of claim 11 wherein the SMI handler is multi-threaded and each detected SMI source is handled in its own thread.

* * * * *